Figure 6:
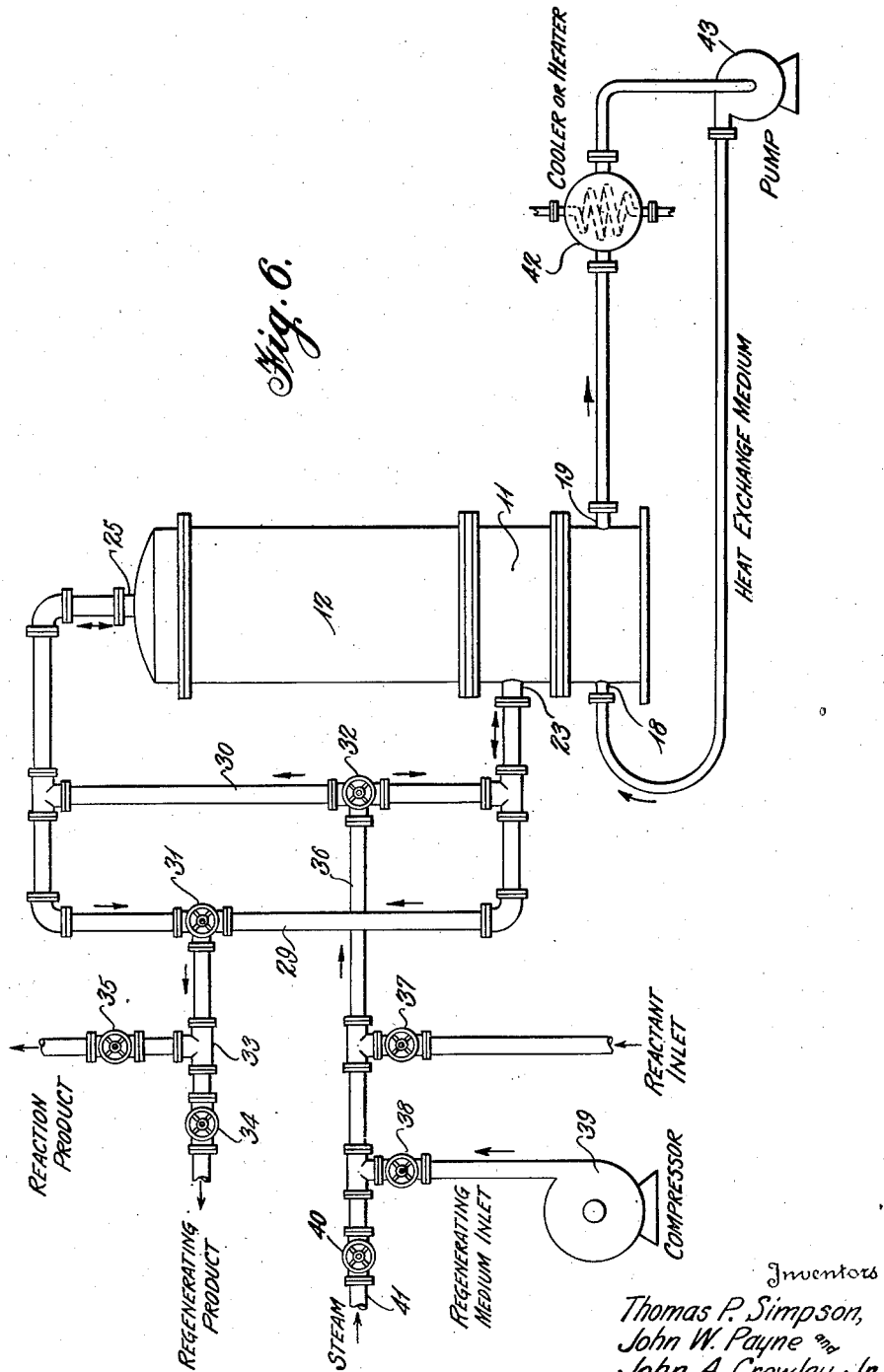

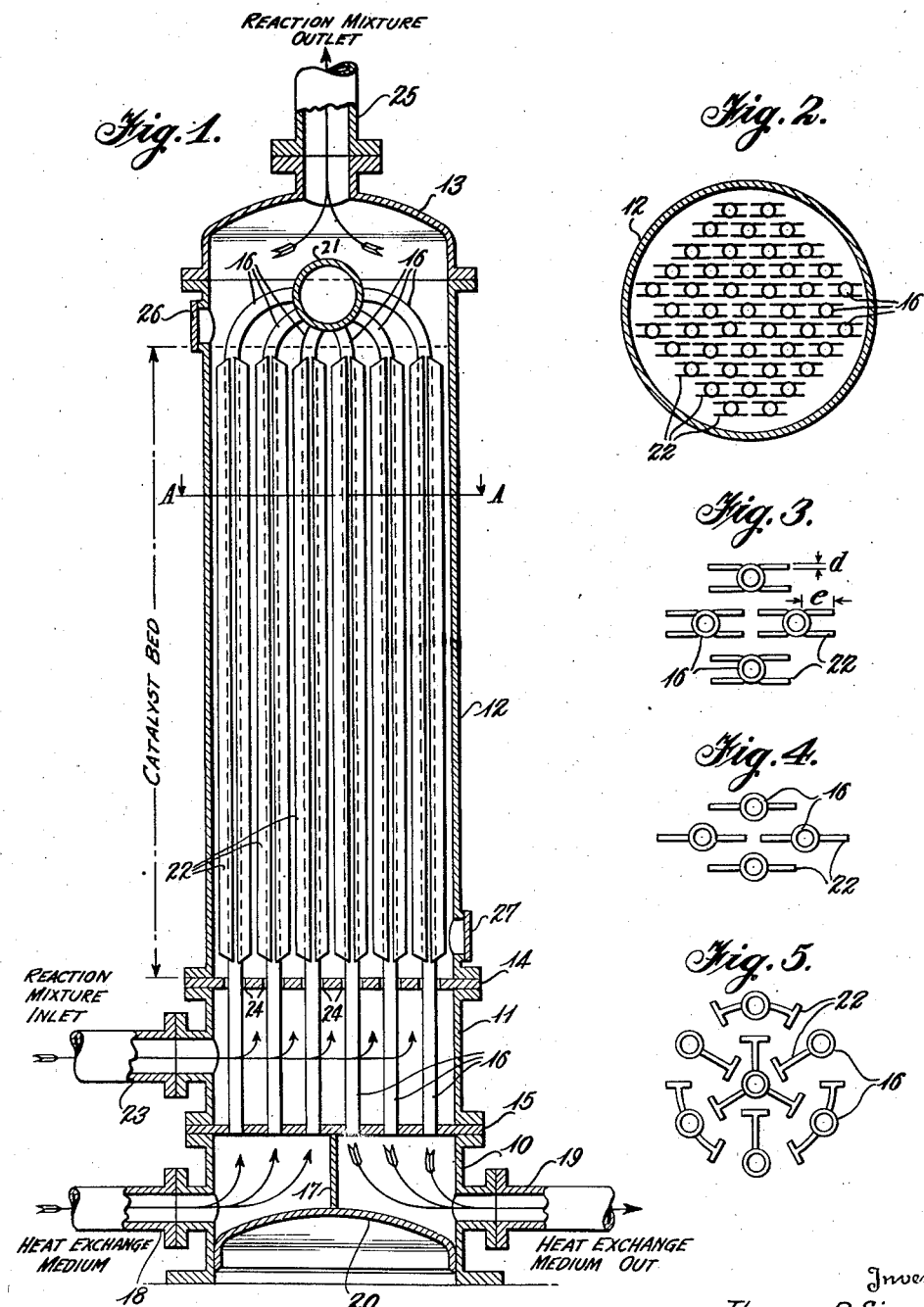

Patented July 23, 1940

2,209,040

UNITED STATES PATENT OFFICE 2,209,040

METHOD FOR CONDUCTING CATALYTIC OPERATIONS

Thomas P. Simpson, John W. Payne, and John A. Crowley, Jr., Woodbury, N. J., assignors to Socony-Vacuum Oil Company, Incorporated, New York, N. Y., a corporation of New York Application September 4, 1937, Serial No. 162,540

12 Claims. (Cl. 196—52)

In the copending application Serial No. 162,069, filed September 1, 1937, now U. S. Patent 2,185,929, issued January 2, 1940, there is disclosed a method of conducting catalytic operations wherein a substance is converted in the presence of a contact mass, and in which the contact mass, when contaminated may be regenerated in situ. The present invention is directed to an improvement in the method of reaction and/or regeneration referred to above, having many of the features and advantages found therein and which is additionally capable of permitting reaction under certain conditions at much higher rates per unit catalyst volume while at the same time giving equivalent accuracy and uniformity of control over conditions within the contact mass. The invention is equally applicable to both endothermic and exothermic reactions and is particularly applicable to those reactions which are highly exothermic or highly endothermic and of such nature that the exothermic or endothermic effect is cumulative, tending to build up zones widely differing in activity from conditions throughout other portions of the contact mass. While the present invention is directed to a process of the general type disclosed and claimed in the co-pending applications, Serial Nos. 162,068 and 162,069, filed September 1, 1937, now U. S. Patents 2,185,928 and 2,185,929, which, respectively, are directed to apparatus and processes for catalytic reactions in general, and, likewise, is of the general type disclosed and claimed in the co-pending applications Serial Nos. 162,070 and 162,071, filed September 1, 1937, now U. S. Patents and 2,185,930 and 2,185,931, which, respectively, are directed to processes and apparatus for catalytic conversion of hydrocarbon oils, the present invention distinguishes from these applications, among other features, by the novel development of re-reversal of flow of fluids passing through the contact material and in contact therewith. The co-pending applications Serial Nos. 162,541 and 162,542, filed September 4, 1937, are likewise directed to processes and apparatus for catalytic conversion of the same general type as that of Serial Nos. 162,068 and 162,069 (Patents 2,185,928 and 2,185,929).

It is an object of this invention to provide a method of conducting catalytic reactions in a contact mass which is capable of bringing about a more even and thorough distribution of reaction and reaction intensity throughout the contact mass, under positive control of the temperature level of the reaction and the distribution of heat during reaction. It is a further object of this invention to provide a method wherein higher rates of reaction can be secured without attendant great difficulties such as localized high intensity of reaction in the case of reactions tending to the formation of reaction zones of unusually high or of unusually low intensity. An object of the invention is the accomplishment of these results not only with highly exothermic reactions, such as for example, the oxidation reactions occurring during regeneration by burning of contact masses upon which carbonaceous material has been deposited, but also with highly endothermic reactions.

All of these objects are attained by means of the method herein disclosed. The basic method over which this disclosure is an improvement, may be described briefly as that of conducting a reaction in a contact mass by causing reactants to flow longitudinally through a bed of contact mass which is of substantial length, and so thin in at least one transverse dimension that heat involved in the reaction may be transferred between interior and exterior portions of the contact mass without substantial temperature differences existing, and positively circulating a heat transfer medium, at controlled temperature, in heat transfer relationship with all portions of the contact mass during reaction. The particular improvement with which this invention is concerned, is that of permitting substantially increased reaction rates per unit time, per unit volume of contact mass under certain conditions without sacrificing ease and accuracy of control and without encouraging detrimental cumulative effects and/or undue localizing reaction intensity by alternately flowing reactants through the contact mass in opposite directions for short periods of time, the sum of a series of such alternating flow periods making up a single reaction or "on stream" period.

To facilitate understanding of this disclosure, reference is made to the drawings attached to this specification, in which Figure 1 shows in diagrammatic form an apparatus adapted for housing this type of regeneration, and Figures 2 to 5 are concerned with internal details thereof. Figure 6 shows, in diagrammatic form, a commercial set-up for the practice of this invention.

Figure 1 shows in slightly diagrammatic form a catalyst chamber embodying the essential features noted. This catalyst chamber consists of a shell composed of parts 10, 11, 12, and 13. Of these, 12 constitutes the jacket for the catalyst space itself, and 13 forms a closure for one end thereof. Shell 11 is joined to shell 12 with an intervening partition sheet 14 held therebetween. Shell 10, with the several parts hereinafter described, constitutes distributing and recollection means for a heat exchanger element, being fitted with tube sheet 15, which supports tubes 16, intermediate baffle plate 17, heat exchange medium inlet 18, heat exchange medium outlet 19, and end plate 20. Tubes 16 are led into return manifold 21 at their upper end, and are preferably furnished with fins 22. Shell 11 is fitted with an inlet 23 whereby reaction mixture may be led into the interior of shell 11, to pass therefrom into the catalyst space in shell 12 by properly distributed orifices in catalyst support plate 14, which orifices may conveniently be formed, as shown, by enlarging the holes in plate 14, through which pass tubes 16, to form annular orifices 24. The reaction mixture passes through these orifices and upward through the catalyst maintained in shell 12, to be collected within head 13 and removed through passage 25. Shell 12 is fitted with sealed openings at 26 and 27, through which catalyst may be introduced and removed when change is necessary. The design and arrangements of the tubes 16 constituting a heat exchanger element is such that these tubes also serve to break the catalyst bed maintained in shell 12 into a large number of longitudinal passages, whose greatest length is parallel to the direction of reaction mixture flow. To do this, advantage may be taken of fins upon tubes 16. Thus these fins 22 serve two purposes. First they serve to define the passages above noted, and of greater importance, they augment the ratio between external and internal surface of the heat exchanger tubes. To accomplish division of the whole catalyst mass into suitable longitudinal passages, each comprising a unit mass or unit path, the tubes and fins preferably should be arranged so as to permit the least resistance to longitudinal flow and, at the same time, to furnish a maximum resistance to lateral flow, although it is not necessary that each unit mass be entirely isolated from contact with other catalyst. The arrangement should also be such as to give a substantially constant cross-sectional area of catalyst throughout the length of the unit paths and catalyst case, which of itself promotes longitudinal flow under uniform conditions. Figure 2 shows a section taken at A—A in Figure 1, and sets forth a convenient and economical arrangement of tubes and fins to accomplish these purposes, which is shown in more detail in Figure 3. Other arrangements of finned tubes are shown in Figures 4 and 5. In these Figures 3, 4, 5, the set-up is designed for the circulation of a heat exchange medium inside the tubes, the catalyst being outside. The functions of these designs may also be attained by use of a large number of closely spaced small tubes, although this method is not preferred.

Alternative forms of reaction case construction in which this process may be practised are shown in the copending application, Serial No. 162,068, filed September 1, 1937 (Patent 2,185,928) and the principles upon which their design is based are discussed fully therein. The principle of design, as therein set forth, defines the relationship between the hydraulic radius of the catalyst-containing reaction paths, the mass velocity of the critical reactant, and the mass velocity of the heat exchange medium. The design is controlled by the ratio of heat liberated or absorbed in the catalyst to heat transferred by the medium. If the heat load per unit time is greater for the regeneration, as in many cases, the regeneration medium may be the critical reactant for design purposes. Under proper conditions, the heat liberation (or demand) may be made substantially uniform per unit volume of catalyst. Heat transfer rate also may be made substantially uniform per unit area of heat transfer surface. The proper proportion of catalyst volume to heat transfer area is then shown by $$\frac{\text{Heat liberated per unit time per unit volume}}{\text{Heat transferred per unit time per unit area}} = 1/HR$$

where HR is a quantity of the nature of a hydraulic radius, having the dimension of length and has a broad range of value from about 1/8" to 2" for possible operation and a preferred range of from 1/8" to 2/3". Also, for reasons of heat transfer within the contact mass, at least one transverse dimension thereof should not be substantially in excess of about 2". The rate of heat liberation or demand is a function of the mass velocity of the critical reactant within the catalyst, in weight per unit time per unit volume of catalyst. For example, in a regeneration operation burning carbon from a mass of the nature of clay, it would be that rate at which, while not exceeding a temperature of about 1000° F. under conditions of operation, would remove carbon at rates of from about 1% by weight of catalyst per hour to about 10% per hour for a broad range of possible operation, and from about 3% to about 6% for preferred operation. The mass velocity of heat transfer medium, of course, depends upon the specific heat and other characteristics of the medium. It is best defined as that mass velocity of heat exchange medium which will extract the required amount of heat while undergoing a temperature rise of not greater than about 50° F., and preferably of from 2° to 10° F.

Referring now to Figure 6, there is shown a catalyst case properly equipped for practise of the invention disclosed herein. It is understood that a complete set-up for commercial operation will include means for the preparation of reactants, and means for after treatment of reaction product, as well as certain forms of heat recovery, but these will not be different from those customarily used in the specific reaction practised, form no part of this invention, and are not herein shown. It is also understood that commercial operation will probably make use of two or more catalyst cases, but the equipment and manner of use of these will be identical with the one catalyst case herein shown. In Figure 6, 12 is the catalyst case, 23 is the inlet for reactant or regenerating medium thereto, 25 is the outlet for products of reaction or regeneration therefrom, and 18 and 19 are respectively inlet and outlet for heat exchange medium, as before. Outlet 25 and inlet 23 are manifolded together by pipes 29 and 30, containing three way valves 31 and 32. The third outlet of valve 31 leads to pipe 33, which branches through valve 34 to means for the disposal of regeneration product and through valve 35 to means for the disposal of reaction product. The third outlet of valve 32 leads to pipe 36 which branches through valve 37 to a means of supply for reactant, through valve 38 to a means of supply for regenerating medium, shown here as an air compressor 39, and through valve 40 to a steam supply pipe 41. Heat exchange medium from outlet 19 passes through heat exchanger 42, where its temperature level may be adjusted, and is returned to inlet 18 by means of pump 43.

The manner of operating the equipment of Figure 6 may be explained as follows; using for the purposes of illustration only a contact mass which is engaged in the catalytic vapor phase cracking of hydrocarbons, which is purged at the end of its "on stream" period with steam, which is then regenerated by burning deposited carbonaceous and tarry materials from the contact mass with an oxidizing gas such as air, which is again purged with steam and which is then returned to the reaction or "on stream" operation.

Assuming the equipment to be on reaction, valves 38, 40, and 34 will be closed. Reactant from pipe 36 will be delivered by valve 32 alternately to 23 and 25, thus flowing, for alternate periods, in opposing direction through the catalyst masses in case 12. Valve 31, alternated simultaneously with valve 32 by any of the usual methods common in the art, directs the reaction product from either 25 or 23 to pipe 33 and it passes from thence through open valve 35 to the usual means of product disposal or after treatment. When the reaction period is finished, valve 37 may be closed, and 40 opened to admit steam for purging. During purging, the alternation may be continued, if desired, but commonly the flow of steam will not be alternated. Reaction purge steam will normally pass out through valve 35. Then valves 40 and 35 may be closed, and 34 and 38 opened, admitting regenerating medium to pipe 36, which will be alternately delivered to 23 and 25 by the operation of valve 32, and alternately relieved from 25 and 23 by the operation of valve 31, as was reaction medium. Regeneration product will be disposed of in the usual manner by means subsequent to valve 34. After regeneration, steam may be admitted for a second purging and the catalyst is ready for reaction.

In this method of operation, the benefit of the improvement herein disclosed is particularly apparent during the regeneration period of the cycle, due to the fact that a greatly increased amount of regeneration air per unit volume of contact mass per unit of time may be fed through the apparatus which while maintaining the same temperature of heat transfer medium circulated and at the same time holding the reaction within the same maximum temperature limit, will permit of a much more rapid regeneration (rate of oxidation of deposited carbon) and thus permit the "on stream" period to occupy a relatively greater proportion of the total cycle time giving a greater yield per unit of cycle time for a given set of reaction conditions.

This method is particularly adaptable to those reactions which tend to establish zones of unduly high activity or which like the above regeneration will normally progress, where the direction of reactant flow is unchanged, by establishing a reaction zone which travels through the contact mass. For example, it has been found that for the same maximum permissible temperature in the contact mass, alternating regeneration as disclosed herein frequently may be twice as rapid as straight through regeneration, without any sacrifice of accuracy of control or of uniformity of regeneration. In general, it will be noted that any reaction, either exothermic or endothermic, tending to occur in a localized zone wherein the heat demand or the heat output may be considerably higher than those obtaining for the catalyst mass as a whole may be benefited by this operation. Of particular interest in connection with the example above cited is the fact that while the vapor phase cracking of hydrocarbons sometimes is not a reaction which may be benefited to any outstanding degree, by this method of operation, the accompanying portion of the unitary process, viz., the regeneration in situ of the spent contact mass is one which may receive striking benefits by operation under this method of disclosure and the net economic result is actually an increase in the yield of cracked hydrocarbon per unit of catalyst or per unit of equipment over a given amount of cycle time.

In this method of operation, the direction of flow of the heat exchange medium is preferably maintained unaltered. The heat exchange medium may be a molten metal or alloy, or fused inorganic salts, or any other medium fluid at the temperature level contemplated, of low vapor pressure, high specific heat, and proper viscosity. Mixtures of fused nitroxy-acid salts of alkali metals are found convenient.

As an example of a practical time cycle for use with this method of operation, we may again refer to the operation of catalytic vapor phase cracking of hydrocarbons to gasoline without reversal of flow during the reaction or "on stream" period but with reversal of flow during the regeneration period. In this operation, a "case" containing a given amount of contact mass would remain "on stream" for say twenty minutes, charging ordinarily one or more volumes of oil (measured upon a cold liquid basis) per volume of contact mass per hour. The reaction temperature will ordinarily be at least 810° F., for example, 850° F. to 950° F., the oil entering the case as a vapor heated to that temperature. During this period, a substantial portion of the oil charged would be converted to gasoline and cokey material to the extent of from about 0.1% to about 2.0% by weight (as carbon) of catalyst would be deposited in the contact mass. For the contact mass a clay granule as hereinbefore described could be used. Then the case would be steamed, to purge, for two minutes after which it would be regenerated by flowing air through the contact mass for a period of sixteen minutes, alternating the direction of flow each thirty seconds. This would be followed by two minutes steaming and return to reaction operation. During regeneration, the temperature would not be allowed to rise above about 1,000° F. and the rate of carbon burn-off would range between about 1% of carbon (percent by weight of contact mass) removed per hour, to about 10% per hour.

For many reactions, such as for that of regenerating a contact mass after the vapor phase cracking of petroleum hydrocarbons as shown as an example above, a 30 second period of flow alternation will be found convenient. The length of this period should be such that there is little tendency for the formation of localized zones of high reaction rate, such as frequently occur in many processes with continuing flow in one direction. For example, in many regenerating operations, conducted with one way flow, there will be found a travelling zone of intense combustion, frequently subject to temperature control only with great difficulty. With the method herein outlined, such conditions may be readily avoided, and frequently the desired reaction can be accomplished at an even greater overall rate. The preferred duration of an alternation period, that is, the length of time between reversals of flow, will range from about 15 to 90 seconds, while many of the benefits of operation of this type may be derived by working with alternation periods within a broader range of from 15 to 200 seconds.

As an example of the benefits to be derived under this method of operation, we may cite experiences had with the regeneration in situ of contact masses previously used for the vapor phase cracking of petroleum hydrocarbons to gasoline. The following data will show comparative results for regeneration with and without reversal of flow, for various density of carbon deposited upon the catalyst, in terms of time required to complete a regeneration, the temperature of the heat transfer medium used and the maximum temperature to which any portion of the contact mass was permitted to rise, being the same in both instances. The contact mass used was composed of granules of a clay-like material, cylindrical in form, having a diameter of about 4.8 mm. and an average length of about 4 to 5 mm.

*Table I*

| Percent coke by weight of contact mass deposited on catalyst | Minutes required to regenerate flowing air straight through | Minutes required to regenerate alternating direction of air flow |
|---|---|---|
| 0.8 | 13.5 | 10.5 |
| 1.0 | 19.5 | 12 |
| 1.2 | 27 | 14 |
| 1.4 | 38 | 16 |
| 1.6 | 57 | 18 |

As a further example of the efficacy and to give some idea of the contrast between zone operation formation under straight through operation and zone formation under alternating operation, the following history of two regenerations quite similar in conditions other than method of operation may be recited. In the first a contact mass containing 1.37% by weight of coke was regenerated, the air flowing straight through. The following observations were made by means of thermo couples inserted near the bottom, at the middle and near the top of the catalyst bed. Five minutes after beginning the regeneration the bottom of the bed reached a peak temperature of 945° F., the middle and top still being only a few degrees higher than the 860° F. at which the regeneration was started. Twenty minutes after the beginning of regeneration, the middle of the catalyst reached a peak temperature of 995° F., the bottom then being about 900° F. and the top being about 875° F. Forty-five minutes after commencing regeneration, the top of the catalyst reached a peak temperature of 990° F., the middle then being about 910° F. and the bottom about 890° F. Fifty-nine minutes after commencing regeneration the top of the catalyst had dropped to a temperature of about 935° F., indicating that regeneration at that zone was substantially complete and that the case might safely be returned to reaction as being completely regenerated. In contrast, the following conditions were observed when the same contact mass after another "on stream" operation was regenerated using the flow reversal method. This time, the amount of coke on the catalyst was 1.61% by weight (a deposit of about 17% greater than that of the previous example). This time seven minutes after commencing regeneration the top of the catalyst attained a peak temperature of 975° F., the middle at that time being 960° F. and the bottom 945° F. Two minutes later (nine minutes total) the bottom of the catalyst reached a peak temperature of 950° F., the middle at that time being 970° F. and the top at that time being 970° F. Six minutes later the middle of the catalyst attained a peak temperature of 995° F., the bottom at that time being 942° F. and the top being 945° F. Ten minutes later after an elapsed period of thirteen minutes total required for regeneration, the top and bottom were at 920° F. and the middle at 940° F., indicating that regeneration was complete and that the contact mass might be returned safely to "on stream" operation as being completely regenerated. Reviewing these two histories we find that the method of regeneration using air flow reversal did not expose any portion of the catalyst to a temperature in excess of that experienced in the straight through method, that the catalyst was as completely regenerated by the second method as by the first and of great importance that the regeneration reaction had been substantially simultaneously occurrent throughout the whole of the contact mass and that the regeneration had been accomplished in thirteen minutes as contrasted with fifty-nine minutes.

It is to be understood that the examples and numerical data given herein are set forth by way of example only, and that the invention is not limited thereto, but is subject only to those limitations which are expressed in the following claims.

We claim:
1. In a method of conducting a regeneration of a clay-type catalyst, contaminated with carbonaceous material, in the same chamber in which the carbonaceous material was deposited comprising passing air through the contact mass in a stream of relatively great length and having one transverse dimension relatively small at a rate such as to burn from 1% to 10% by weight of carbon, based on catalyst, from said catalyst per hour, the improvement which comprises reversing the direction of the stream of air at relatively short intervals throughout the regeneration period, and continuously circulating a heat exchange medium in indirect heat transfer relationship with the catalyst in said stream, while controlling the rate and temperature of the heat exchange medium to permit no portion of the regenerating catalyst to rise substantially above 1000° F.

2. In a method of conducting a unitary process for the reaction of hydrocarbons in the presence of a contact mass and a subsequent oxidation regeneration in situ of said contact mass comprising flowing hydrocarbon material under reaction conditions of temperature and pressure through a confined contact mass and thereafter flowing regeneration medium through said contact mass, the improvement which comprises reversing the direction of flow of regeneration medium at relatively short intervals throughout the regeneration period.

3. In a method for conducting a unitary process for reaction of hydrocarbons in the presence of a contact mass followed by oxidation regeneration in situ of said contact mass, the improvement which comprises flowing hydrocarbons at reaction temperature and pressure through a confined contact mass, reversing the direction of flow of hydrocarbons at relatively short intervals throughout the reaction period, thereafter flowing regeneration medium through said contact mass and reversing the direction of flow of regenerating medium at relatively short intervals throughout the regeneration period.

4. In a method for conducting a unitary operation for reaction of hydrocarbons in the presence of a contact mass followed by oxidation regeneration in situ of the contact mass comprising passing hydrocarbon material at temperature and pressure appropriate for reaction longitudinally through a contact mass of substantial length and having at least one transverse dimension relatively small and thereafter passing regenerating medium longitudinally through said mass, the improvement which comprises reversing the direction of flow of regenerating medium through the contact mass at relatively short intervals throughout the regeneration period, and continuously passing a heat exchange medium in indirect heat transfer relationship with all portions of the contact mass.

5. In a method for conducting a unitary operation of reaction of hydrocarbons in the presence of a contact mass followed by oxidation regeneration in situ of the contact mass, the improvement comprising passing hydrocarbon material at reaction temperature and pressure longitudinally through a contact mass of substantial length and having at least one transverse dimension relatively small, reversing the direction of flow of hydrocarbons at relatively short intervals throughout the reaction period, thereafter passing regenerating medium longitudinally through said contact mass, reversing the direction of flow of the regenerating medium at relatively short intervals throughout the regeneration period, and continuously passing a heat exchange medium in indirect heat transfer relationship with all portions of the contact mass.

6. In a method of conducting a unitary process for a catalytic reaction in the presence of a contact mass, followed by a regeneration in situ of said contact mass wherein reactants are flowed through said contact mass during said reaction period and a gaseous regeneration medium is flowed through said contact mass during regeneration period and the operating conditions are maintained within desirable limits during both of said periods, the improvement which comprises reversing the direction of flow of reactants through said contact mass at relatively short intervals throughout said reaction period and reversing the direction of flow of said regeneration medium at relatively short intervals throughout said regeneration period.

7. In a method of conducting a unitary process for a catalytic reaction in the presence of a contact mass, followed by a regeneration in situ of said contact mass wherein reactants the flowed through said contact mass during said reaction period and a gaseous regeneration medium is flowed through said contact mass during regeneration period and the operating conditions are maintained within desirable limits during both of said periods, the improvement which comprises reversing the direction of flow of said regeneration medium at relatively short intervals throughout said regeneration period.

8. In a method of conducting a regeneration of a contact mass, contaminated with carbonaceous impurities deposited thereon during a prior treatment of carbonaceous material, wherein a combustion supporting gas is passed through said contact mass under such conditions as to burn inactive carbonaceous impurities off said contact mass without subjecting the contact mass to a deleterious temperature, the improvement which comprises reversing the direction of flow of said gas through said contact mass at relatively short intervals throughout the regeneration period.

9. In a method of conducting a regeneration of a clay-type catalyst contaminated with carbonaceous impurities wherein a gaseous combustion-supporting regeneration medium is flowed through said catalyst during regeneration period under such conditions as to burn carbonaceous impurities off said catalyst without subjecting the catalyst to a deleterious temperature, the improvement which comprises reversing the direction of flow of said regeneration medium through said catalyst at relatively short intervals throughout said regeneration period, the length of time between reversals of flow in each case being between about 15 and about 200 seconds.

10. In a method of conducting a unitary process for a catalytic cracking of petroleum oils to gasoline in the presence of a contact mass, followed by a regeneration in situ of said contact mass wherein the oils are flowed through said contact mass during said reaction period and a gaseous oxidizing regeneration medium is flowed through said contact mass during regeneration period and the operating conditions are maintained within desirable limits during both of said periods, the improvement which comprises reversing the direction of flow of said regeneration medium through said contact mass at relatively short intervals throughout said regeneration period.

11. In a method of conducting a unitary process for a catalytic cracking of petroleum oils to gasoline in the presence of a contact mass, followed by a regeneration in situ of said contact mass wherein the oils are flowed through said contact mass during said reaction period and a gaseous oxidizing regeneration medium is flowed through said contact mass during regeneration period and the operating conditions are maintained within desirable limits during both of said periods, the improvement which comprises reversing the direction of flow of petroleum oils through said contact mass at relatively short intervals throughout said reaction period and reversing the direction of flow of said regeneration medium at relatively short intervals throughout said regeneration period.

12. In a method of conducting a unitary process for a catalytic cracking of petroleum oils to gasoline in the presence of a clay catalyst, followed by a regeneration in situ of said catalyst wherein the oils are flowed through said catalyst during said reaction period and a gaseous oxidizing regeneration medium is flowed through said catalyst during regeneration period and the operating conditions are maintained within desirable limits during both of said periods, the improvement which comprises reversing the direction of flow of reactants through said catalyst at relatively short intervals throughout said reaction period and reversing the direction of flow of said regeneration medium at relatively short intervals throughout said regeneration period, the length of time between reversals of flow in each case being between about 15 to about 90 seconds.

THOMAS P. SIMPSON.
JOHN W. PAYNE.
JOHN A. CROWLEY, Jr.

CERTIFICATE OF CORRECTION.

Patent No. 2,209,040.                                    July 23, 1940.

THOMAS P. SIMPSON, ET AL.

It is hereby certified that error appears in the printed specification of the above numbered patent requiring correction as follows: Page 1, first column, line 35, strike out the word "and"; page 5, first column, line 59, claim 7, for "the" read --are--; and that the said Letters Patent should be read with this correction therein that the same may conform to the record of the case in the Patent Office.

Signed and sealed this 25th day of March, A. D. 1941.

Henry Van Arsdale,
Acting Commissioner of Patents.

(Seal)